United States Patent [19]
Suzuki

[11] Patent Number: 5,541,476
[45] Date of Patent: Jul. 30, 1996

[54] IMAGE READER

[75] Inventor: Kiyosuke Suzuki, Saitama, Japan

[73] Assignee: Sony Corporation, Tokyo, Japan

[21] Appl. No.: 348,853

[22] Filed: Nov. 28, 1994

[30] Foreign Application Priority Data

Dec. 6, 1993 [JP] Japan .................................. 5-339229

[51] Int. Cl.$^6$ ........................................ H01J 1/62
[52] U.S. Cl. ............................... 313/487; 358/500
[58] Field of Search ............................. 313/487; 358/500

[56] References Cited

U.S. PATENT DOCUMENTS

| | | | |
|---|---|---|---|
| 3,676,728 | 7/1972 | Schreurs | 313/487 |
| 3,897,360 | 7/1975 | Lagos | 252/301.4 P |
| 4,527,087 | 7/1985 | Taya et al. | 313/487 |
| 4,791,336 | 12/1988 | Morimoto et al. | 313/496 |
| 4,793,691 | 12/1988 | Enomoto et al. | 359/50 |
| 5,008,789 | 4/1991 | Arai et al. | 362/255 |
| 5,251,024 | 10/1993 | Furukawa et al. | 358/527 |
| 5,260,777 | 11/1993 | Konine et al. | 358/500 |
| 5,289,081 | 2/1994 | Tamatani et al. | 313/487 |
| 5,308,824 | 5/1994 | Matsushita et al. | 503/226 |
| 5,350,971 | 9/1994 | Jeong | 313/487 |
| 5,414,535 | 5/1995 | Kanmoto et al. | 358/487 |

*Primary Examiner*—Alvin E. Oberley
*Assistant Examiner*—Lawrence O. Richardson
*Attorney, Agent, or Firm*—William S. Frommer; Alvin Sinderbrand

[57] ABSTRACT

A color film image reader for obtaining an image signal from a color film, comprising a light source for irradiating the color film with light; a color CCD for producing blue, green and red image signals from the light received from the color film; and means for adjusting the level of each of the image signals obtained by the color CCD. The light source comprises a 3-band type fluorescent lamp, and the relative emission powers thereof regarding blue, green and red light are approximately at a ratio of 10:4:1, wherein the molar weight ratios of its blue, green and red fluorescent materials satisfy the functions that (molar weight ratio of blue fluorescent material.quantum efficiency of blue fluorescent material):(molar weight ratio of green fluorescent material.quantum efficiency of green fluorescent material).(molar weight ratio of red fluorescent material.quantum efficiency of red fluorescent material)≈10:4:1. The glue fluorescent material is composed of $BaM_{g2}Al_{16}O_{27}$:Eu; the green fluorescent material is composed of $La_2O_3.0.2SiO_2.0.9P_2O_5$:Ce, Tb; and the red fluorescent material is composed of $3.5MgO.0.5MgF_2/GeO_2$:$Mn^{4+}$.

16 Claims, 7 Drawing Sheets

IMAGE READER

BACKGROUND OF THE INVENTION

The present invention relates to a color film image reader and, more particularly, to an apparatus adapted for reading an image of an orange-masked negative film.

The known systems for producing an image signal by reading an image from an exposed color film are roughly divided into a system using a black-and-white sensor and a system using a color sensor with a color filter chipped on a charge coupled device.

Figure 9:
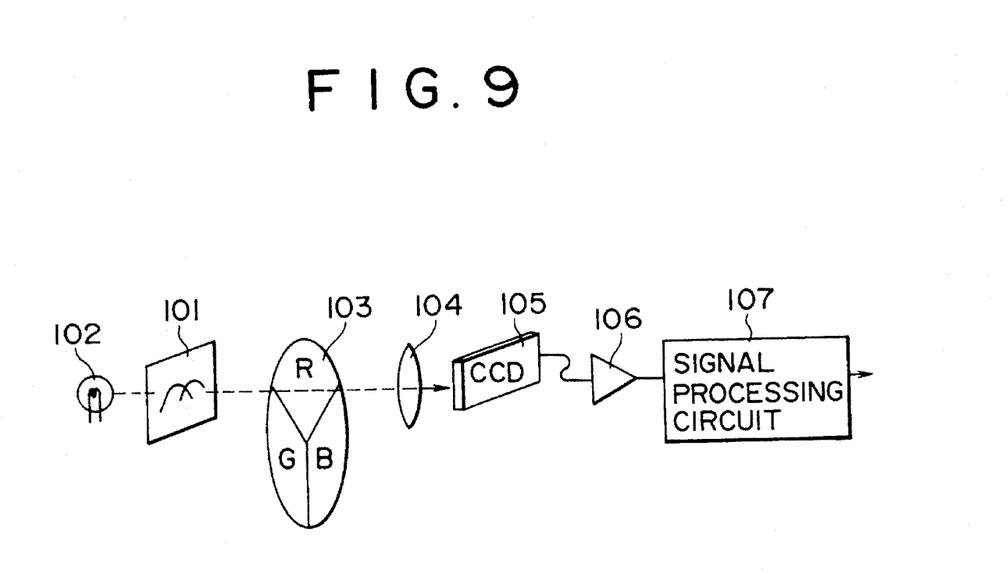
FIG. 9 is a block diagram of an image reader previously proposed.

In the system using a black-and-white sensor, as shown in FIG. 9 for example, an exposed color film 10 is interposed between a light source 102 such as a tungsten lamp or the like and a color decomposing filter 103, and light transmitted through the film 101 is caused to be incident upon a solid state imaging device (CCD) 105, which is a black-and-white sensor, via a lens 104.

In the case of sampling a red component, the color decomposing filter 103 is so disposed that its red transmitting filter R is positioned between the color film 101 and the lens 104, whereby the light transmitted through the filter R is incident upon the CCD 105. The red light incident upon the CCD 105 is converted into an electric signal, which is then inputted via an amplifier 106 to a signal processing circuit 107 where a required signal process is executed.

A line sensor is employed for the CCD 105, which is scanned relative to the color film 101 so that a red signal of one image frame is obtained. Next the filter 103 is so rotated that a green transmitting filter G is positioned between the color film 101 and the lens 104, and an operation similar to the aforementioned is performed to thereby obtain a green signal of one image frame. Further the filter 103 is so rotated that a blue transmitting filter B is positioned between the color film 101 and the lens 104, and an operation similar to the aforementioned is performed to thereby obtain a blue signal of one image frame. The electric signals of the individual colors thus obtained are synthesized with one another to consequently reproduce the color image on the color film 101.

Figure 10:
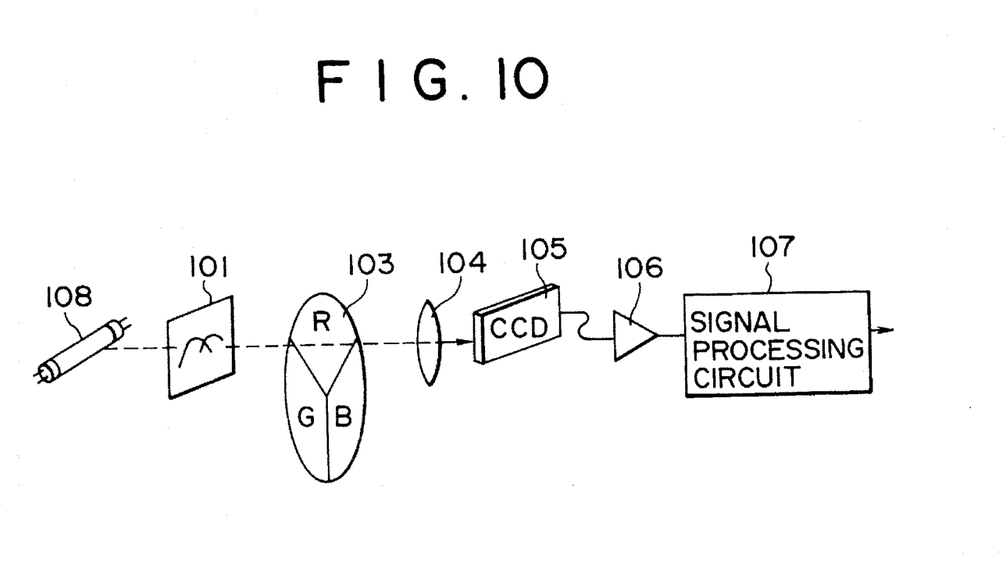
FIG. 10 is a block diagram of another image reader previously proposed.
Figure 11:
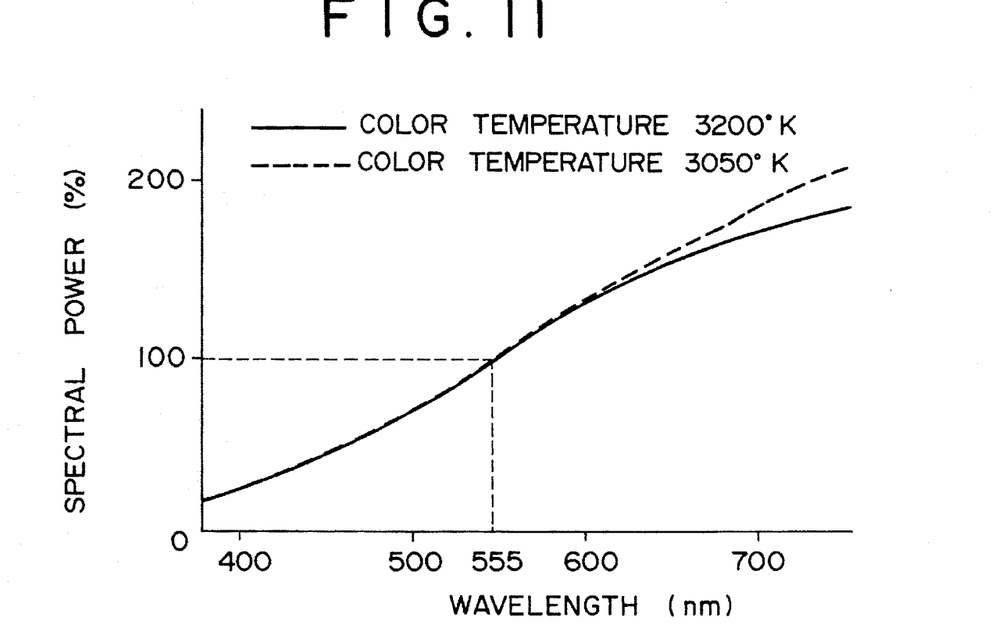
FIG. 11 graphically shows the spectral power distribution of a tungsten lamp.
Figure 12:
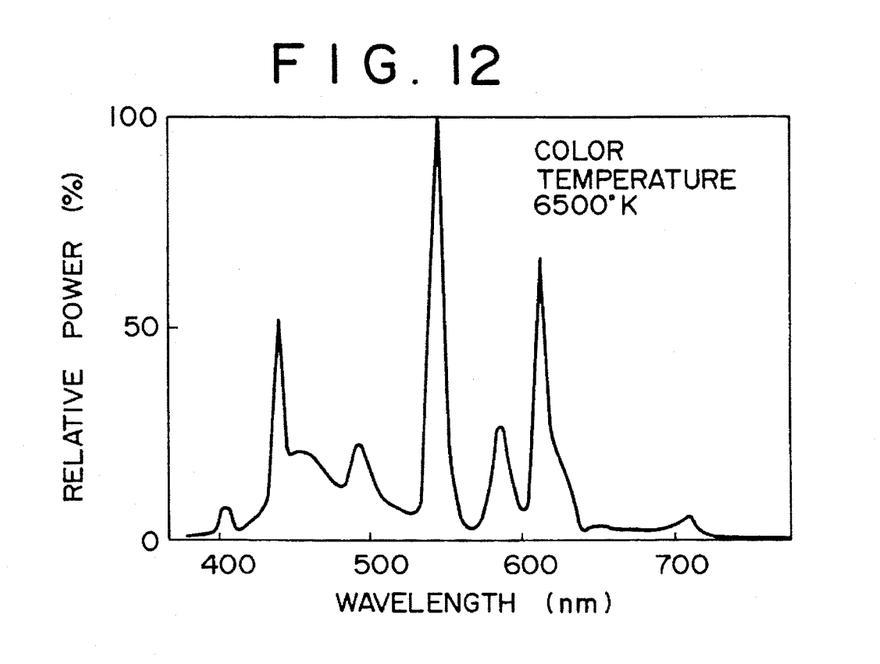
FIG. 12 graphically shows the spectral power distribution of a 3-band type fluorescent lamp.

FIG. 10 shows an example of another image reader using a 3-band type fluorescent lamp 108 as a light source in place of a tungsten lamp. In the image reader of FIG. 10, the difference from the foregoing example is merely in the point that its light source is changed from the aforesaid tungsten lamp 102 to a 3-band type fluorescent lamp 108. Therefore a repeated explanation of the operation is omitted here. However, the spectral distribution of the tungsten lamp is such that the integral value of the spectral power in the area corresponding to R is in a range of ½ to ⅓ as compared with the integral value of the spectral power in the area corresponding to B as shown in FIG. 11; whereas in the case of using a 3-band type fluorescent lamp, the respective integral values of the spectral powers in the areas corresponding to R, G, B are approximately equal to one another as shown in FIG. 12, so that well-balanced R, G, B signals are outputted from the CCD 105.

According to the image reader employing a black-and-white sensor, it is necessary to execute scanning three times to obtain one image as described, whereby the reading time is prolonged with another disadvantage of a complicated structure. There is known another image reader with a black-and-white sensor wherein light sources are provided for R, G, B respectively and electric signals are successively obtained by switching the R, G, B light sources in succession. However, in the image reader of this type also, there exists the necessity of successively obtaining electric signals of individual colors, and some disadvantages are unavoidable including that the reading time is prolonged and the light sources are structurally complicated.

In a color negative film, a colored coupler known as an orange mask is employed to realize, in printing, clear and distinct coloring. Therefore a color negative film looks in orange, and its spectral density curve is such as graphically shown in FIG. 3.

Figure 3:
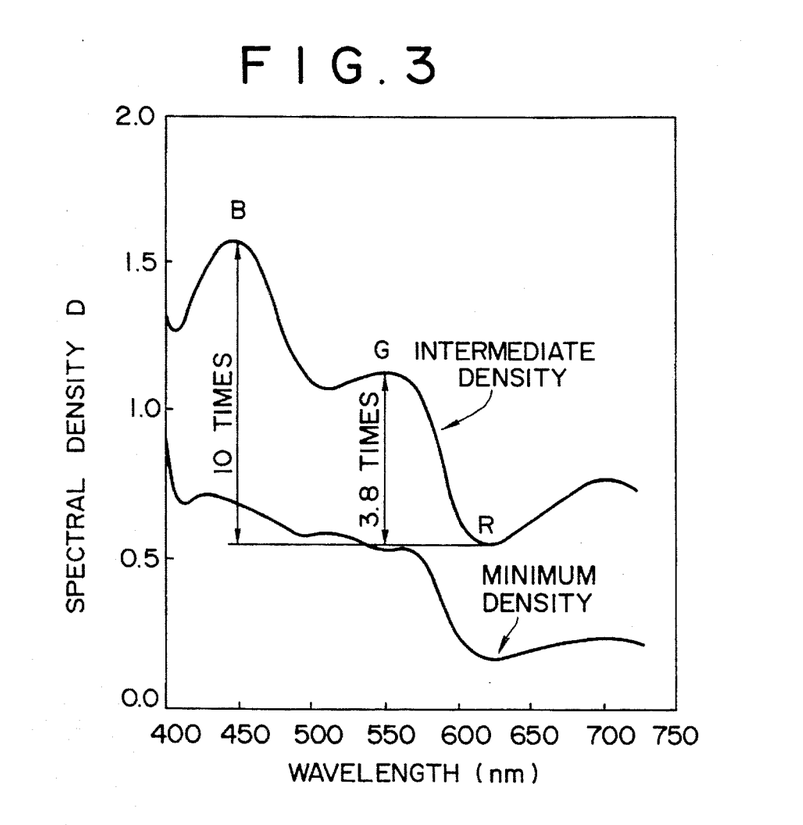
FIG. 3 graphically shows spectral density curves of a color negative film.

In FIG. 3, the ordinate represents the spectral density D which is expressed as D=log 1/T (where T denotes the transmissivity of a color film). The minimum density shown in FIG. 3 is the spectral density in the orange mask, i.e., in the non-exposed area. Meanwhile the intermediate density shown therein is the spectral density obtained by an intermediate between non-exposure and exposure to white, i.e., by exposure to gray. As represented by the intermediate density in this spectral density curve, the spectral density of green (G) light is about 3.8 times that of red (R) light, and the spectral density of blue (B) light is about 10 times that of red (R) light. Namely, the transmissivity of blue (B) light through the color negative film is low, and the amount of the transmitted blue light is about ¹/₁₀. Meanwhile the amount of the green (G) light transmitted through the color negative film is about ¼ as compared with that of the red (R) light. Accordingly, if electric signals of individual colors are directly synthesized with one another, it becomes impossible to reproduce the colors of the image on the color film. For this reason, there is executed a process of attenuating the levels of the green and red electric signals so that the level of the blue electric signal may be coincident with the levels of the green and red electric signals.

FIG. 11 graphically shows the spectral power distribution of a tungsten lamp. In FIG. 11, spectral powers in respective wavelengths are plotted with 100% corresponding to the spectral power in 555 nm where the visibility is maximum. As shown in FIG. 11, the spectral power distribution of a tungsten lamp is such that the spectral power of red (R) light ranging approximately from 400 to 500 nm, i.e., the integral value in this area, is about ½ to ⅓ of the spectral power of blue (B) light ranging approximately from 600 to 700 nm, i.e., the integral value in this area. Accordingly, in using a tungsten lamp as a light source, the correction mentioned above needs to be performed in consideration of the spectral powers as well.

However, when a 3-band type fluorescent lamp is used as a light source, the correction may be executed without giving any consideration to the spectral powers since the red, green and blue spectral powers are approximately equal to one another as shown in FIG. 12. The spectral power is determined by the integral value in the area of each color.

Figure 1:
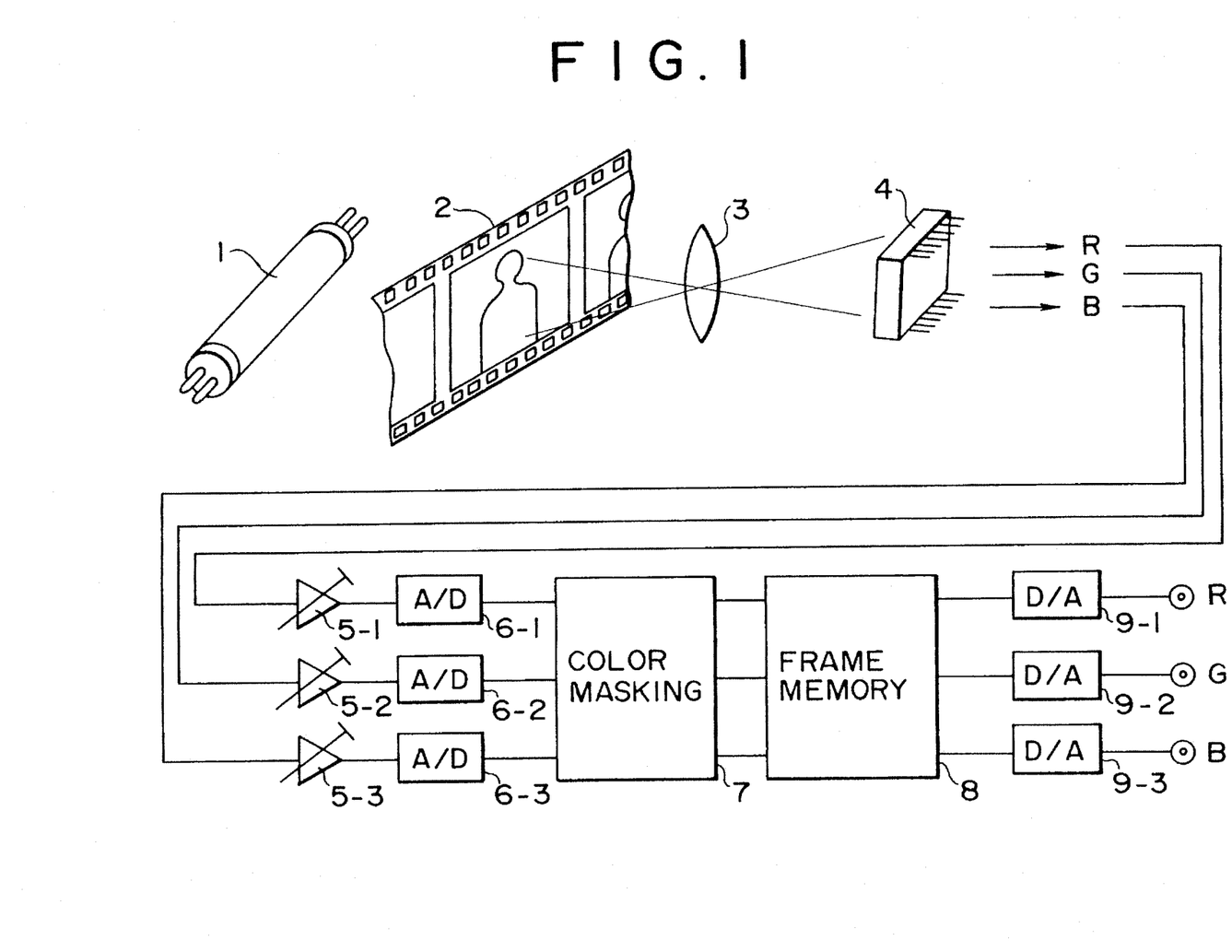
FIG. 1 is a block diagram of an image reader according to the present invention.

FIG. 1 shows an image reader employing a color sensor with a color filter chipped on a charge coupled device.

In the image reader of FIG. 1, an exposed color film 2 is positioned between a light source 1 such as a 3-band type fluorescent lamp and a lens 3, and the light transmitted through the color film 2 is caused to be incident, via the lens 3, upon a color charge coupled device (CCD) 4 which is a color sensor with red (R), green (G) and blue (B) color filters provided per pixel. Then, for example, a red component from the color film 2 is converted into an electric signal by pixels each furnished with a red transmitting filter. The red electric signal R thus converted is amplified by an RGB gain control circuit 5-1 and is further converted into a digital signal by an A-D converter 6-1 so as to be adapted for digital processing. The R digital signal thus obtained is then inputted to a matrix circuit 7.

Meanwhile a green component from the color film 2 is converted into an electric signal by pixels each furnished with a green transmitting filter. The green electric signal G thus converted is amplified by an RGB gain control circuit 5-2 and is further converted into a digital signal by an A-D converter 6-2 so as to be adapted for digital processing. The G digital signal thus obtained is then inputted to the matrix circuit 7.

Further a blue component from the color film 2 is converted into an electric signal by pixels each furnished with a blue transmitting filter. The blue electric signal B thus converted by the color CCD 4 is amplified by an RGB gain control circuit 5-3 and is further converted into a digital signal by an A-D converter 6-3 so as to be adapted for digital processing. The B digital signal thus obtained is then supplied, together with the R and G digital signals, to the matrix circuit 7 where color masking is executed, and the processed signals are stored in a frame memory 8. The color masking is a process of correcting the colors by mixing predetermined amounts of the R, G and B digital signals with one another.

The R, G and B digital signals stored in the frame memory 8 in this manner are inputted to D-A converters 9-1–9-3 respectively to be converted into analog signals, which are then delivered from R, G and B output terminals respectively.

As for the light source, a tungsten lamp may be used as well in place of a 3-band type fluorescent lamp.

In the image reader employing the color CCD 4, image data of one picture can be obtained by scanning merely once as described, so that it becomes possible to shorten the required reading time.

Since the color filter provided for the color CCD is structurally on-chip type, it is difficult to achieve sharp characteristics in the color filter. Therefore, the spectral sensitivity characteristics of the color CCD become such as graphically shown in FIG. 2 where, relative to the green (G) and blue (B) spectral sensitivity characteristics. The sensitivities thereof are raised with deviations from the green (G) and blue (B) areas on the long wavelength side.

Further, the spectral curve of a color negative film is such as shown in FIG. 3 where the intermediate spectral density of green (G) light is about 3.8 times that of red (R) light, and the intermediate spectral density of blue (B) light is about 10 times that of red (R) light. Namely, the transmissivity of blue (B) light through the color negative film is low, and the amount of the transmitted blue (B) light is about ¹⁄₁₀. Meanwhile the amount of the green (G) light transmitted through the color negative film is about ¼ as compared with that of the red (R) light. Accordingly, if electric signals of individual colors are directly synthesized with one another, it becomes impossible to exactly reproduce the colors of the image on the color film. For this reason, there is executed a process of properly adjusting the gains of the RGB gain control circuits 5-1–5-3 which amplify the R, G and B electric signals respectively.

Figure 2:
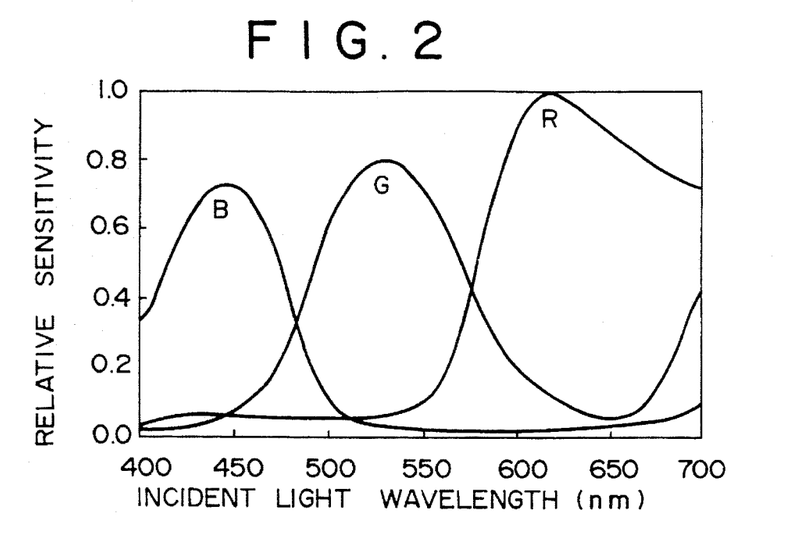
FIG. 2 graphically shows the spectral sensitivity characteristics of a color CCD.
Figure 4:
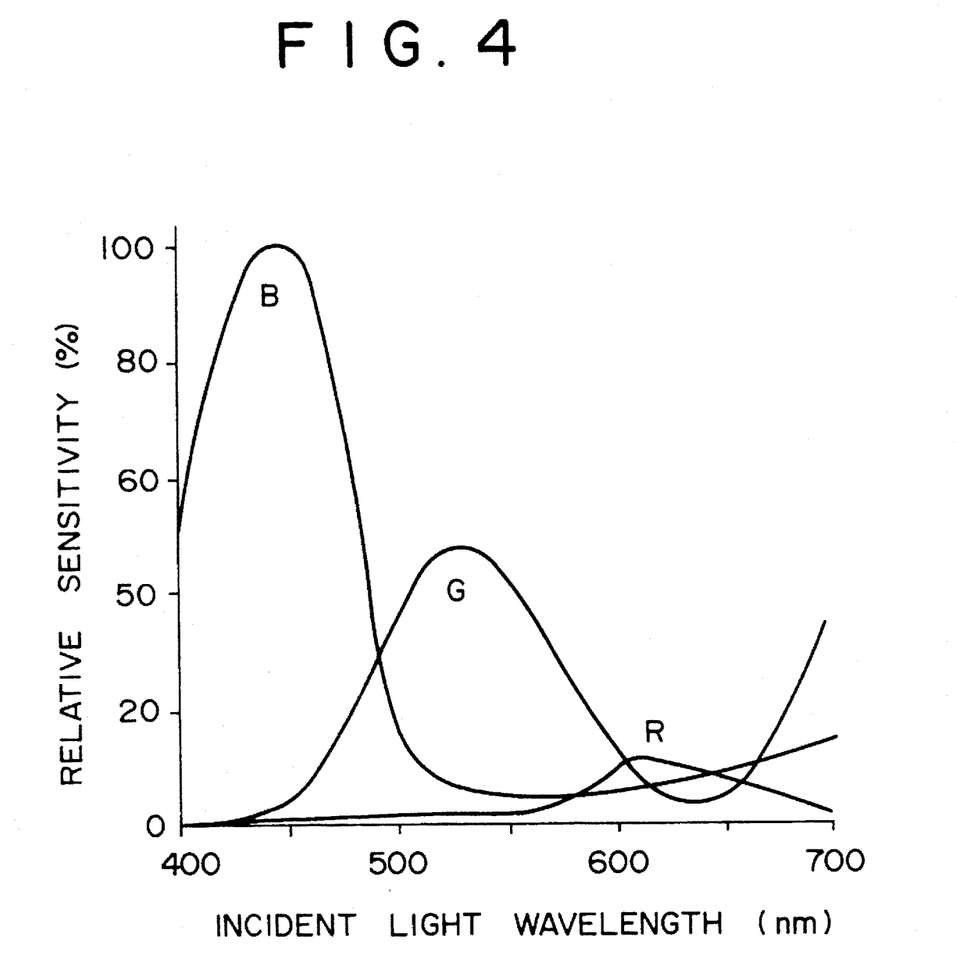
FIG. 4 graphically shows the corrected spectral sensitivity characteristics of a CCD.

However, if the spectral density is corrected in the manner mentioned, it follows that the spectral sensitivity of the color CCD shown in FIG. 2 is also corrected. Consequently, the spectral characteristic of the color CCD after the correction is such as shown in FIG. 4. As is apparent from FIG. 4 where the sensitivity of green (G) light is indexed as 100%, the relative sensitivity of red (R) light is rendered extremely lower than that of blue (B) and green (G) light. In addition, since the characteristic curve is such that the sensitivity rises on the long wavelength side of green (G) and blue (B) light as mentioned, the green (G) and blue (B) components in the corresponding areas are detected as the red (R) component. As a result, there arises a problem that the colors are turned to be impure. Besides the above, in the use of a tungsten lamp, the spectral power of red (R) light ranges approximately from ½ to ⅓ in comparison with the spectral power of blue (B) light as shown in FIG. 11, so that an adequate correction needs to be executed in consideration of such spectral power difference. As a result, it becomes necessary to further lower the relative sensitivity of red light to eventually worsen the purity of colors.

OBJECT AND SUMMARY OF THE INVENTION

It is therefore an object of the present invention to provide a light source for a film reader which is capable of solving the problems mentioned above.

More specifically, the object of the present invention resides in providing an improved film image reader wherein an image signal is obtained by means of a color CCD and a 3-band type fluorescent lamp is employed as a light source.

According to one object of the invention, there is provided a light source such as a 3-band type fluorescent lamp for a film image reader, wherein the relative emission powers of the lamp regarding blue, green and red light are approximately at a ratio of 10:4:1. In this light source, the molar weight ratios of its blue, green and red fluorescent materials satisfy the functions that (molar weight ratio of blue fluorescent material.quantum efficiency of blue fluorescent material):(molar weight ratio of green fluorescent material.quantum efficiency of green fluorescent material):(molar weight ratio of red fluorescent material.quantum efficiency of red fluorescent material)≈10:4:1. The red fluorescent material is composed of $3.5MgO.0.5MgF_2/GeO_2:Mn^{4+}$. Meanwhile the blue fluorescent material is composed of $BaMg_2Al_{16}O_{27}:Eu$, and the green fluorescent material is composed of $La_2O_3.0.2SiO_2.0.9P_2O_5:Ce,Tb$.

According to another aspect of the present invention, there is provided a color film image reader for obtaining an image signal from a color film. The image reader comprises a light source for irradiating the color film with light; a color CCD for producing blue, green and red image signals from the light received from the color film; and a means for adjusting the level of each of the image signals obtained by the color CCD; wherein the light source consists of a 3-band type fluorescent lamp, and its relative emission powers regarding blue, green and red light are approximately at a ratio of 5.5:4:1. In this lamp, the fluorescent material is composed of $3Ca(PO_4)_2.Ca(F,Cl)_2:Sb^{3+}$.

In the image reader of the present invention employing the above-described light source, the reproducibility of a red color can be enhanced as compared with the conventional 3-band type fluorescent lamp in reading an image from a color negative film covered with an orange mask. And the signal-to-noise ratio can be improved due to the adequate balance of the red, green and blue outputs from the color CCD.

Furthermore, in the the color negative film where the blue absorption coefficient is high, the film reading speed is determined by the amount of the blue light incident upon the CCD. In respect of this point also, there is attainable an advantage that the amount of emitted blue light is raised three times or so in comparison with the conventional 3-band type fluorescent lamp, and therefore the amount of the blue light incident upon the CCD is widely increased. Consequently it becomes possible to shorten the time required for storing electric charges in the CCD, thereby realizing a remarkable rise in the reading speed.

The above and other features and advantages of the present invention will become apparent from the following description which will be given with reference to the illustrative accompanying drawings.

DESCRIPTION OF THE PREFERRED EMBODIMENTS

The construction of an image reader according to the present invention is similar to the aforementioned example shown in the block diagram of FIG. 1, and it employs an improved light source which will be described below.

The light source in a first embodiment of the present invention consists of a 3-band type fluorescent lamp which uses the following fluorescent materials.

Blue $BaMg_2Al_{16}O_{27}$:Eu Main peak wavelength 452 nm Quantum efficiency 1.03

Green $La_2O_3.0.2SiO_2.0.9P_2O_5$:Ce,Tb Main peak wavelength 543 nm Quantum efficiency 0.93

Red $Y_2O_3$:Eu Main peak wavelength 611 nm Quantum efficiency 0.99

In the first embodiment using the above fluorescent materials, the respective molar weight ratios of the blue, green and red fluorescent materials are so set as to satisfy the following equation.

(Molar weight ratio of blue fluorescent material.quantum efficiency of blue fluorescent material):(Molar weight ratio of green fluorescent material.quantum efficiency of green fluorescent material):(Molar weight ratio of red fluorescent material.quantum efficiency of red fluorescent material)≈10:4:1 ... (1)

Since the above numerical values may be used for the quantum efficiencies, the molar weight ratios of the fluorescent materials of the individual colors are thereby determined. In the known prior art, the ratio mentioned was 1:1:1.

Figure 5:
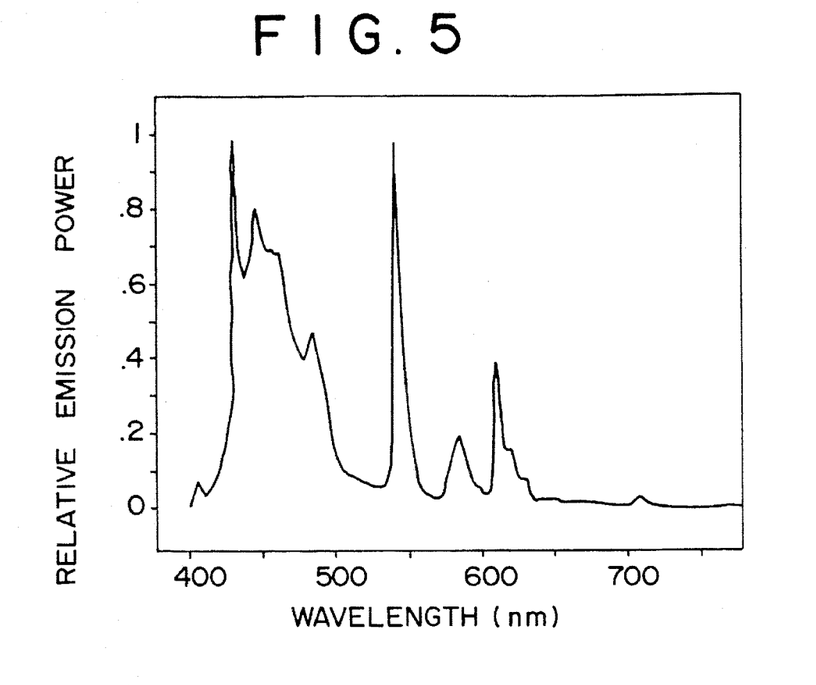
FIG. 5 graphically shows the spectral power distribution of a fluorescent lamp in a first embodiment of the present invention.

The spectral power distribution of the first embodiment is shown in FIG. 5. As apparent from this graph, the integral values of the powers in the areas corresponding respectively to blue, green and red are approximately at a ratio of 10:4:1.

In the image reader of FIG. 1 where a 3-band type fluorescent lamp having the fluorescent materials at the above compounding ratio is employed as a light source 1, the light emitted at a spectral power ratio of B:G:R=10:4:1 from the light source 1 is transmitted through a color negative film 2, then is condensed via a lens 3 and is caused to be incident upon a color CCD 4, where the incident light is converted into R, G, B electric signals. Since the spectral density of the color negative film 2 shown in FIG. 3 is corrected by the light source 1 whose spectral power ratio of blue, green and red light is 10:4:1, the level-adjusted R, G, B electric signals are outputted from the color CCD 4.

Therefore, in RGB gain control circuits 5-1–5-3, merely some variations of the R, G, B signals are adjusted. And the R, G, B signals outputted from the RGB gain control circuits 5-1–5-3 are supplied respectively to A-D converters 6-1–6-3 so as to be converted into digital signals, which are then supplied to a matrix circuit 7. Subsequently, color masking is performed in the matrix circuit 7, and the signals thus processed are stored in a frame memory 8.

As described, when the 3-band type fluorescent lamp of the first embodiment is employed as the light source 1, the requirements for the RGB gain control circuits 5-1–5-3 are merely to perform some gain control alone, so that it becomes possible to obtain a clear image without any color impurity.

A light source in a second embodiment of the present invention consists of a 3-band type fluorescent lamp similarly to the aforementioned one in the first embodiment, but the fluorescent materials used therein are different as follows.

Blue $BaMg_2Al_{16}O_{27}$:Eu Main peak wavelength 452 nm Quantum efficiency 1.03

Green $La_2O_3.0.2SiO_2.0.9P_2O_5$:Ce,Tb Main peak wavelength 543 nm Quantum efficiency 0.93

Red $3.5MgO.0.5MgF_2/GeO_2$:$Mn^{4+}$ Main peak wavelength 655 nm Quantum efficiency 0.75

In the use of such fluorescent materials, the molar weight ratios of the blue, green and red fluorescent materials are set according to Eq. (1).

Figure 6:
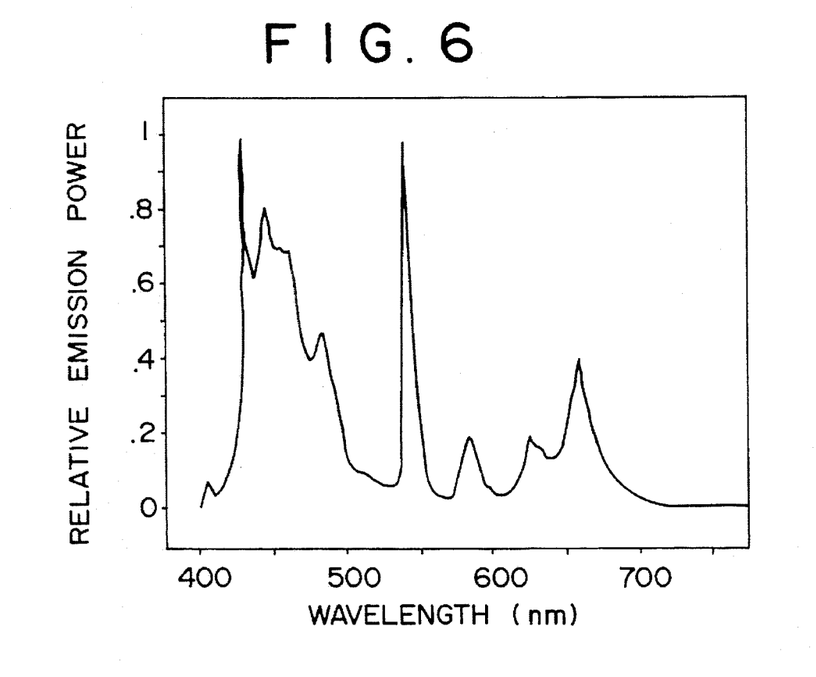
FIG. 6 graphically shows the spectral power distribution of a fluorescent lamp in a second embodiment of the invention.

The spectral power distribution of the second embodiment is shown in FIG. 6.

Figure 7:
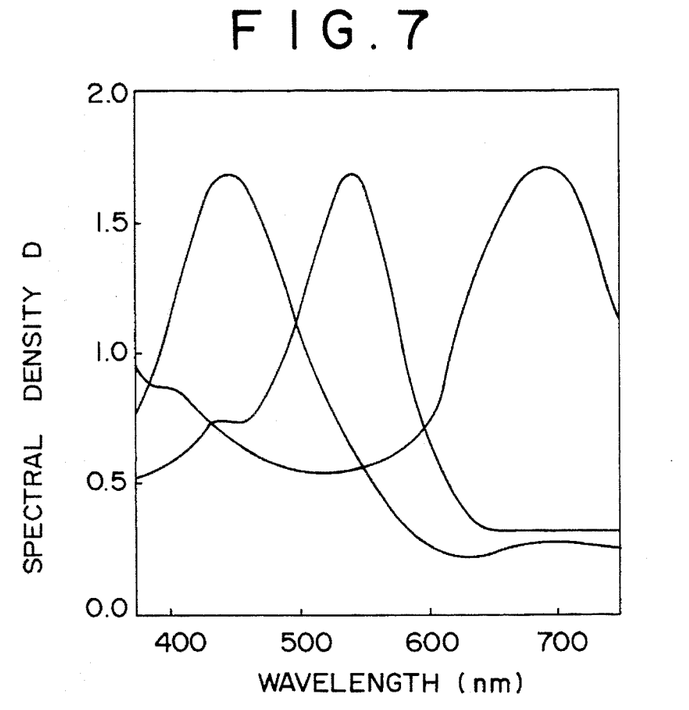
FIG. 7 graphically shows spectral density curves of colors of a negative film.

FIG. 7 graphically shows the spectral density curves of colors of a negative film, wherein the peak density wavelength of red light is about 690 nm. In comparison therewith, the peak wavelength of red light in the 3-band type fluorescent lamp of the first embodiment is about 620 nm, so that there exists a wide deviation between the peak wavelengths. For this reason, proper correction for the red light may not exactly be achieved. Therefore, the second embodiment employs a different light source where the peak wavelength of red light is 655 nm, which is approximate to the product of the spectral sensitivity characteristic of the color CCD and the spectral density curve of the negative film color.

When a 3-band type fluorescent lamp having such fluorescent materials is used as the light source 1 in the image reader of FIG. 1, the light emitted at a spectral power ratio of B:G:R=10:4:1 from the light source 1 is transmitted through a color negative film 2, then is condensed via a lens 3 and is caused to be incident upon a color CCD 4, where the incident light is converted into R, G, B electric signals. Since the spectral density of the color negative film 2 shown in FIG. 3 is corrected by the light source 1 where the spectral power ratio of blue, green and red light is 10:4:1 and is substantially coincident with the peak wavelength in the color spectral density curve, so that the level-adjusted R, G, B electric signals are outputted from the color CCD 4.

Therefore, in the RGB gain control circuits 5-1–5-3, merely some variations of the R, G, B signals may be adjusted. And the R, G, B signals outputted from the RGB gain control circuits 5-1–5-3 are supplied respectively to the A-D converters 6-1–6-3 so as to be converted into digital signals, which are then supplied to the matrix circuit 7. Subsequently, color masking is performed in the matrix circuit 7, and the signals thus processed are stored in the frame memory 8.

A light source in a third embodiment of the present invention consists of a fluorescent lamp using one kind of bluish white fluorescent material which will be described below.

Fluorescent material $3Ca(PO_4)_2 \cdot Ca(F,Cl)_2:Sb^{3+}$ Peak wavelength 480 nm Quantum efficiency 0.96 or Fluorescent material $MgWO_4$ Peak wavelength 480 nm Quantum efficiency 1.00

Figure 8:
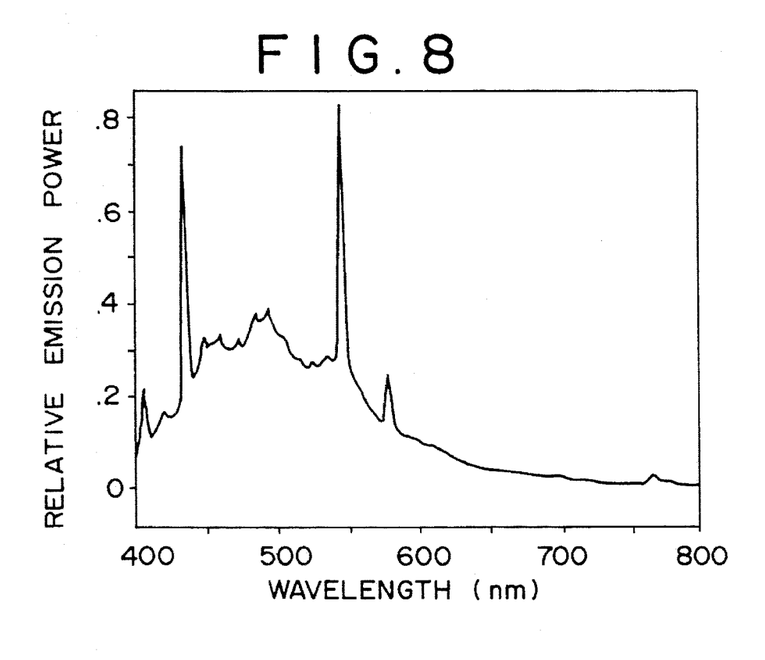
FIG. 8 graphically shows the spectral power distribution of a fluorescent lamp in a third embodiment of the invention.

FIG. 8 graphically shows the spectral power distribution of a fluorescent lamp using the above fluorescent material, wherein the R:G:B spectral power ratio is approximately 5.5:4:1. Therefore the spectral density of an orange-masked color negative film can be performed to some extent. For achieving complete correction, the R, G, B levels are adjusted by the gain control circuits 5-1–5-3 respectively in such a manner that the spectral power ratio becomes approximately 10:4:1, whereby the spectral density is correctable with facility. Since the control ratio of the gain control circuits 5-1–5-3 can be suppressed within a double, it is possible to prevent impurity of colors.

Using one kind of a fluorescent material is effective to eliminate variations of the material amounts that may result from compounding three kinds of fluorescent materials. Therefore the spectral power distribution is not varied despite replacement of the light source 1, whereby there is no necessity of adjusting the gain control circuits 5-1–5-3.

According to the present invention employing the light source described hereinabove, the color reproducibility for red light can be enhanced in comparison with the conventional 3-band type fluorescent lamp in reading an image from an orange-masked color negative film.

In addition, the signal-to-noise ratio can be improved due to the well-balanced red, green and blue outputs from the color CCD.

Furthermore, in the color negative film where the blue absorption coefficient is high, the film reading speed is determined by the amount of the blue light incident upon the CCD. In respect of this point also, there is attainable an advantage that the amount of emitted blue light is raised three times or so as compared with the conventional 3-band type fluorescent lamp, and therefore the amount of the blue light incident upon the CCD is widely increased. Consequently it becomes possible to shorten the time required for storing electric charges in the CCD, thereby realizing a remarkable rise in the reading speed.

What is claimed is:

1. A light source for use in a film image reader for obtaining an image signal by means of a color CCD, said light source comprising of a 3-band type fluorescent lamp, wherein the relative emission powers of said lamp regarding blue, green and red light are approximately at a ratio of 10:4:1.

2. The light source according to claim 1, wherein the molar weight ratios of its blue, green and red fluorescent materials satisfy the functions that (molar weight ratio of blue fluorescent material.quantum efficiency of blue fluorescent material):(molar weight ratio of green fluorescent material.quantum efficiency of green fluorescent material):(molar weight ratio of red fluorescent material.quantum efficiency of red fluorescent material)≈10:4:1.

3. The light source according to claim 2, wherein the red fluorescent material is composed of $3.5MgO \cdot 0.5MgF_2/GeO_2:Mn^{4+}$.

4. The light source according to claim 3, wherein said blue fluorescent material is composed of $BaMg_2Al_{16}O_{27}:Eu$, and said green fluorescent material is composed of $La_2O_3 \cdot 0.2SiO_2 \cdot 0.9P_2O_5:Ce,Tb$.

5. The light source according to claim 2, wherein said blue fluorescent material is composed of $BaMg_2Al_{16}O_{27}:Eu$; said green fluorescent material is composed of $La_2O_3 \cdot 0.2SiO_2 \cdot 0.9P_2O_5:Ce,Tb$; and said red fluorescent material is composed of $Y_2O_3:Eu$.

6. A color film image reading apparatus for obtaining an image signal from a color film, comprising:

a light source for irradiating said color film with light;

a color CCD for receiving the light from said color film and for producing blue, green and red image signals; and means for adjusting the level of each of the image signals obtained by said color CCD;

wherein said light source comprises of a 3-band type fluorescent lamp, and the relative emission powers thereof regarding blue, green and red light are approximately at a ratio of 10:4:1.

7. The color film image reading apparatus according to claim 6, wherein said light source is such that the molar weight ratios of its blue, green and red fluorescent materials satisfy the functions that (molar weight ratio of blue fluorescent material.quantum efficiency of blue fluorescent material):(molar weight ratio of green fluorescent material.quantum efficiency of green fluorescent material):(molar weight ratio of red fluorescent material.quantum efficiency of red fluorescent material)=10:4:1.

8. The color film image reading apparatus according to claim 7, wherein said light source is such that the red fluorescent material thereof is composed of $3.5MgO \cdot 0.5MgF_2/GeO_2:Mn^{4+}$.

9. The color film image reading apparatus according to claim 8, wherein said light source is such that the blue fluorescent material thereof is composed of $BaMg_2Al_{16}O_{27}:Eu$; and the green fluorescent material thereof is composed of $La_2O_3 \cdot 0.2SiO_2 \cdot 0.9P_2O_5:Ce,Tb$.

10. The color film image reading apparatus according to claim 7, wherein said light source is such that the blue fluorescent material thereof is composed of $BaMg_2Al_{16}O_{27}:Eu$; the green fluorescent material thereof is composed of $La_2O_3 \cdot 0.2SiO_2 \cdot 0.9P_2O_5:Ce,Tb$; and the red fluorescent material thereof is composed of $Y_2O_3:Eu$.

11. A light source for use in a film image reader for obtaining an image signal by means of a color CCD, said light source comprising of a 3-band type fluorescent lamp, wherein the relative emission powers of said lamp regarding blue, green and red light are approximately at a ratio of 5.5:4:1.

12. The light source according to claim 11, wherein the fluorescent material of said lamp is composed of $3Ca(PO_4)_2 \cdot Ca(F,Cl)_2:Sb^{3+}$.

13. The light source according to claim 11, wherein the fluorescent material of said lamp is composed of $MgWO_4$.

14. A color film image reading apparatus for obtaining an image signal from a color film, comprising:

a light source for irradiating said color film with light;

a color CCD for receiving the light from said color film and for producing blue, green and red image signals; and means for adjusting the level of each of the image signals obtained by said color CCD;

wherein said light source comprises a single band type fluorescent lamp whose relative emission powers regarding blue, green and red light are approximately at a ratio of 5.5:4:1.

15. The color film image reading apparatus according to claim 14, wherein the fluorescent material of said lamp is composed of $3Ca(PO_4)_2 \cdot Ca(F,Cl)_2:Sb^{3+}$.

16. The color film image reading apparatus according to claim 14, wherein the fluorescent material of said lamp is composed of $MgWO_4$.

* * * * *